United States Patent [19]
Bononi et al.

[11] Patent Number: 5,927,400
[45] Date of Patent: Jul. 27, 1999

[54] DEVICE AND METHOD FOR THE ADJUSTMENT OF THE FLOW RATE OF A LIQUID, WITH CLOSED LOOP CONTROL

[75] Inventors: Elvio Bononi, Alessandria; Costanzo Gadini, Casale Monferrato, both of Italy

[73] Assignee: Eltek S.p.a., Monferrato, Italy

[21] Appl. No.: 08/658,100

[22] Filed: Jun. 4, 1996

[51] Int. Cl.$^6$ .............................. F28F 27/00; G01F 15/02
[52] U.S. Cl. ........................... 165/295; 73/198; 137/499; 236/36
[58] Field of Search .................................... 165/295, 299; 236/78 C, 49.3, 36; 251/129.04; 73/198; 137/497, 499

[56] References Cited

U.S. PATENT DOCUMENTS

| | | | |
|---|---|---|---|
| 3,857,446 | 12/1974 | Kenny | 169/60 |
| 3,877,304 | 4/1975 | Vetsch | 73/231 M |
| 4,155,253 | 5/1979 | Kato et al. | 73/861.83 |
| 4,328,926 | 5/1982 | Hall, Jr. | 236/49.3 |
| 4,419,052 | 12/1983 | Stamm | 416/214 A |
| 4,694,681 | 9/1987 | Hoffman | 73/861.83 |
| 5,138,888 | 8/1992 | Walmer | 73/861.83 |
| 5,335,708 | 8/1994 | Murakami et al. | 165/299 X |

FOREIGN PATENT DOCUMENTS

| | | |
|---|---|---|
| 0029509 | 6/1981 | European Pat. Off. . |
| 0626566 | 11/1994 | European Pat. Off. . |
| 0127177 | 8/1982 | Japan ..................................... 165/295 |
| 8103378 | 11/1981 | WIPO . |

Primary Examiner—William E. Wayner
Attorney, Agent, or Firm—Levine & Mandelbaum

[57] ABSTRACT

A device is described, for the adjustment of the flow rate of a liquid which circulates within thermal convectors or heat exchangers making up part of heating, conditioning or ventilation plants, or apparatus for the thermal treatment of products. The device comprises a body within which a movable shutter is provided, the position of which allows for adjusting the quantity of liquid flowing between at least an inlet duct and an outlet duct, the positioning of the shutter being obtained by way of a suitable actuator.

The device comprises a control circuit and an instant flow rate and/or quantity meter of the liquid flowing in one of said ducts, for the automatic and continuous adjustment of the flow, by way of the appropriate positioning of the shutter.

26 Claims, 14 Drawing Sheets

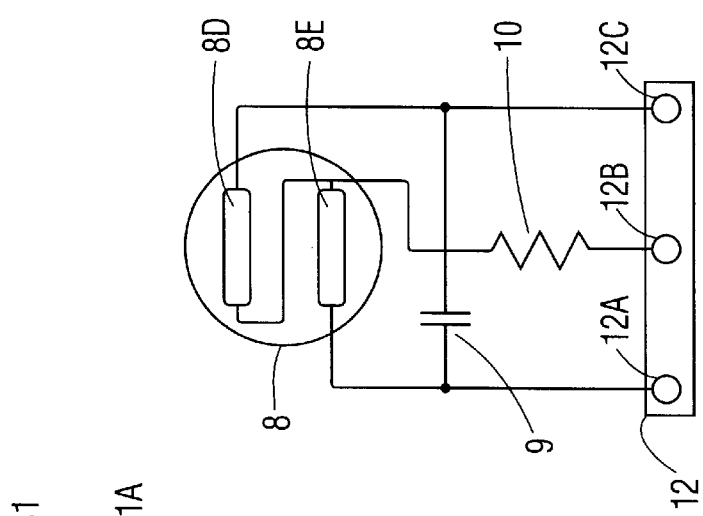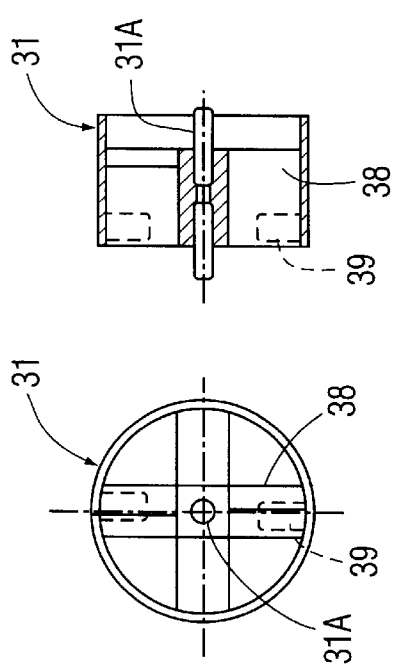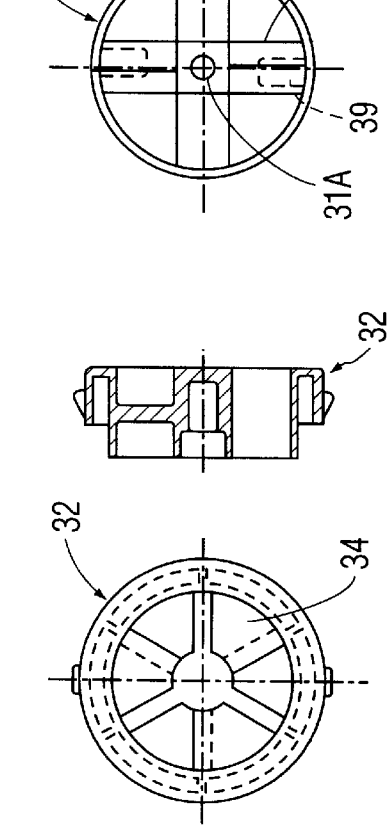

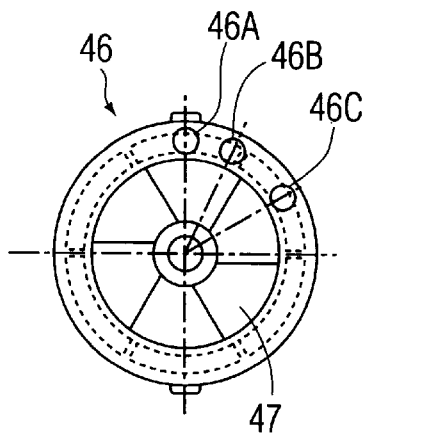
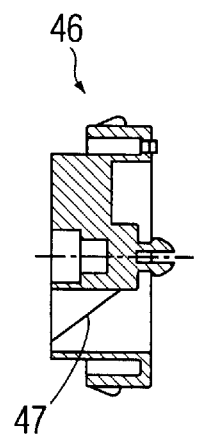
FIG. 28A    FIG. 28C
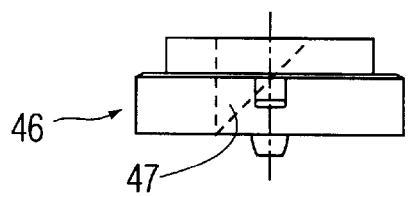
FIG. 28B
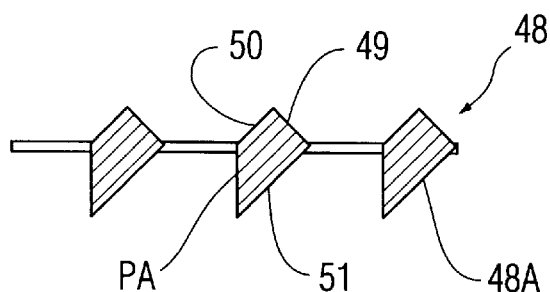
FIG. 29
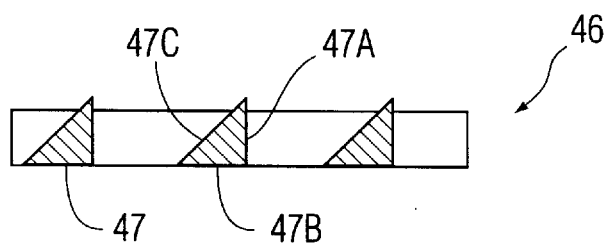
FIG. 30

DEVICE AND METHOD FOR THE ADJUSTMENT OF THE FLOW RATE OF A LIQUID, WITH CLOSED LOOP CONTROL

FIELD OF THE INVENTION

The present invention refs to a device for the adjustment of the flow rate of a liquid, as described in the preamble of claim 1, and to a control method as described in the preamble of claim 22.

Devices of the cited type are normally used in heating, conditioning or ventilating plants, or in machines for the thermal treatment of products, in conjunction with thermal convectors or heat exchangers.

BACKGROUND OF THE INVENTION

Flow regulators are known with two or three ways, being provided with a bi-directional asynchronous motor that, through a gear kinematic motion, produces the linear movement of a shutter; such a shutter operates for closing and opening one or more liquid inlet or outlet ducts, in order to shutter the flow rate: by varying the position of the shutter, it is therefore possible to modify the flow rate of the liquid that flows in a utilizing apparatus being connected to the hydraulic circuit.

Most of the known devices carry out the adjustment of the shutter position in a somewhat approximate way, by operating the motor for a prefixed time, to which a certain position of the shutter corresponds; according to other known solutions, which are more complex from the manufacturing viewpoint, sensors means of the shutter position are provided.

Valves are also known, being provided with a liquid meter; such valves are provided for carrying out the delivery of a prefixed liquid quantity, and then to return to the the normal closure condition, until the next delivery cycle.

A typical problem of the known flow rate adjusters or regulators, and in particular of those being of the type with a time-controlled shutter, is the poor precision, deriving from the absence of a closed-loop control system, as it will be better result in the following.

A further drawback of said flow adjusters is the rapid deterioration of their mechanical parts; such a deterioration is due to the continuous stress to which the shutter kinematic motion is made subject, when the electric supply is still active at the attainment of the end of stroke; such a drawback has been partly reduced by the use of the cited sensors for the shutter position. However, also in these solutions, the maintenance of the shutter in a prefixed position cannot guarantee for itself the attainment of a constant liquid flow rate; in fact, with the same passage section, a liquid flow rate can vary in function of the pressure variations in the relative hydraulic network.

In the case of pressure variations, and therefore of the flow rate, the known systems are therefore not suitable to allow a sufficiently precise adjustment, inasmuch as they are not able to control eventual flow variations, that can depend upon different causes (for instance, restrictions and occasional occlusions of the conduits).

Another drawback, being typical in the sector of application of the present invention, derives from the difficulty of utilizing the same regulator onto different categories of thermal convectors or heat exchangers, i.e. having different passage sections for the liquid; the connection of a regulator having a passage section being greater than the passage section of a given heat exchanger determines in fact the practical impossibility of exploiting all the adjustment range of the regulator.

For example, in the case of a regulator having a passage section being double with respect to the passage section of the conduits of the heat exchanger, the adjustment range being comprised between the "all open" position and "50% open" position of the shutter becomes practically useless and the adjustment of the total flow rate of the liquid may be realized by exploiting only the adjustment of the remaining 50% of the controlled stroke of the shutter; the measure resolution of the device is therefore halved, with the consequent precision loss.

For a more specific example, let consider a regulator, being provided for the use on a heat exchanger or thermal convector having the conduits of a given section. Such a regulator is equipped with a shutter having a total stroke of 8 mm, and with an adjustment system that carries out the measure of the shutter position in 80 points; in this case, we have a resolution of 0,1 mm per point, and therefore a rate adjustment of the flow regulator with steps being equal to $\frac{1}{80}$.

Consider now that such a regulator is connected to a convectors with conduits being of smaller section, for example being equal to $\frac{1}{8}$ of the previous one; the work range of the regulator is therefore reduced to $\frac{1}{8}$(i.e. 1 mm) of the total possible adjustment range (i.e. 8 mm): in this case, always considering a resolution of 0,1 mm per point, we will have therefore a flow rate adjustment with steps of $\frac{1}{8}$, which is clearly less precise than the previous one.

From the given example, in which the effective adjustment is equal to $\frac{1}{8}$ of the total possible adjustment range, the precision or resolution loss of the systems according to the known art is evident, in the case of use on various conduits having different sections.

The cited drawback involves necessarily a calibration of the work starting point of the regulator, which has to be carried out in the manufacturing phase of the device or during its installation. In the first case, it becomes necessary to produce a wide range of different regulators, each having passage sections being equal to the passage sections of the conduits of the relevant convectors, with evident drawbacks for standardizations, stock management, availability in short time of devices being different, etc.

Concerning the second case, regulators are known which allow, in the installation phase on the utilizing apparatus, for the manual calibration of the work starting point of the shutter; such devices are however easily subject to adjustment errors in the installation phase.

Other problems of the known adjustment devices depend upon the fact that they are realised in a metallic material; this is necessary due to the high clamping forces that, in the installation phase, have to be exercised on the hydraulic terminals of the flow regulator device, for assuring the necessary sealing.

Such a realization causes the formation of condensate onto the metallic walls of the regulator body: the presence of such a condensate, and the same fact that the metallic body is an optimal electric conductor, require therefore great attention in the electric insulation of the device; in particular, a high insulation is required between the electric connector of the actuator and the metallic body of the device.

OBJECT OF THE INVENTION

The present invention has the aim of solving the above cited problems and, in particular, to indicate a flow regulator device which is precise in the adjustment, which allows to assure the constancy of the same in the different conditions of use, and which is flexible in use, simple, low cost and of compact realization.

Within such frame, a first aim of the invention is that of realizing a device having a precise system for the adjustment of the flow rate of a fluid, in order to obtain a rapid and precise adjustment of the temperature of thermal convectors or heat exchangers being part of heating, conditioning or ventilating plats, or machines for the thermal treatment of products; for such a type of applications, therefore, the invention has the aim of allowing energy economy, by virtue of a precise adjustment that avoids fluctuations or temperature variations due to thermal inertia. A second aim of the invention refers to the realization of a device for the adjustment of the flow rate of a fluid that is able to be installed on different categories of thermal convectors, having conduits of different sections.

A third aim of the invention consists in the realization of a regulator device which, when desired, allows to vary the degree of the measure resolution in function of the different conditions of use.

A fourth aim of the present invention refers to the realization of a flow regulator device which is able to be installed in a simple and quick way, for which high clamping forces of the hydraulic joints are not necessary, and which can be therefore realized in thermoplastic material. Said aims are reached according to the present invention by means of the device and the method of the annexed claims.

BRIEF DESCRIPTION OF THE DRAWINGS

The characteristics and advantages of the present invention will result in being clear from the detailed description which follows and from the annexed drawings, supplied purely as an explanatory and non-limiting example, in which:

FIG. 18A, 18B and 18C are views in projection of a particular of the meter of FIG. 16;

FIG. 19A, 19B and 19C are views in projection of another particular of the meter of FIG. 16;

FIG. 20 is a schematic view of the electric supply circuit of an actuator making up part of the device according to the present invention;

FIG. 28A, 28B and 28C are views in projection and partial section of another particular of the flow rate meter of FIG. 26;

FIG. 29 is a schematic section of the particular of FIG. 27;

FIG. 30 is a schematic section of the particular of FIG. 28;

DETAILED DESCRIPTION OF THE INVENTION

Figure 1:
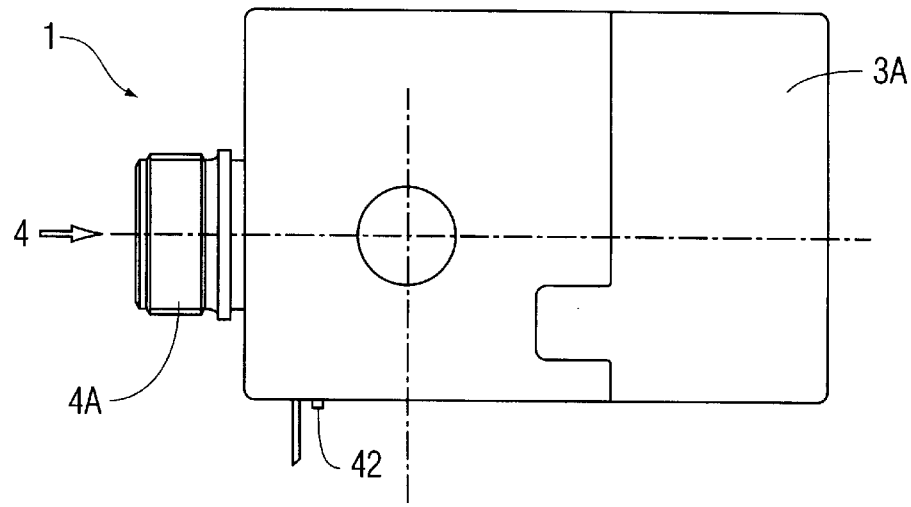
FIG. 1 is plan view of the device according to the present invention.
Figure 2:
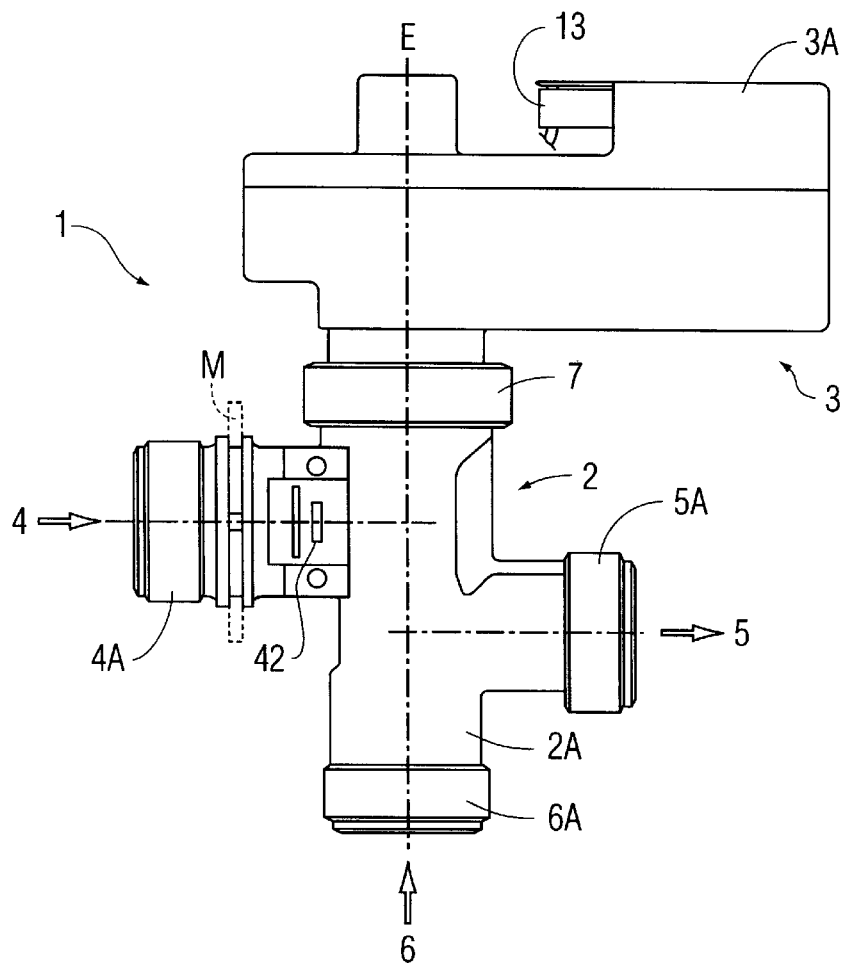
FIG. 2 is an elevation view of the device of FIG. 1.
Figure 3:
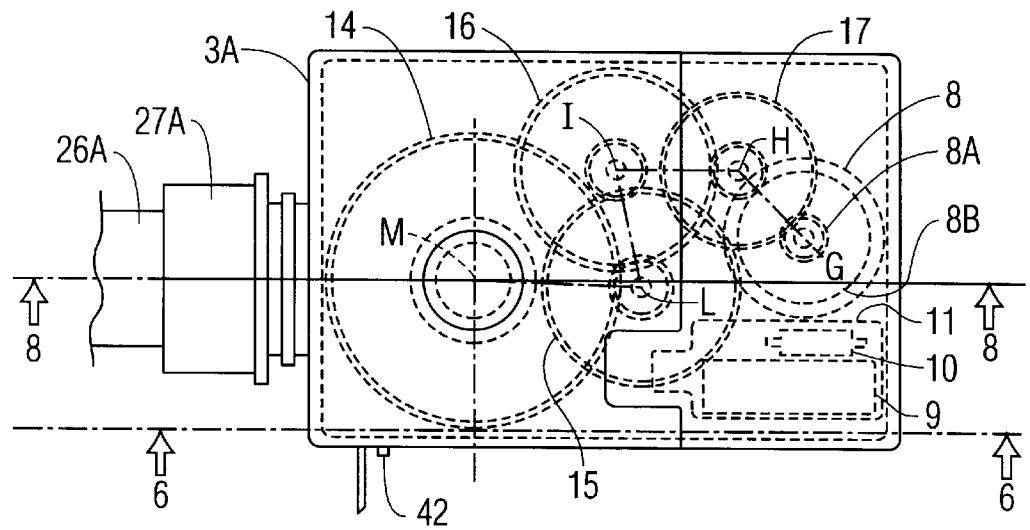
FIG. 3 is a schematic plan view of the device of FIG. 1, connected to hydraulic ducts.
Figure 4:
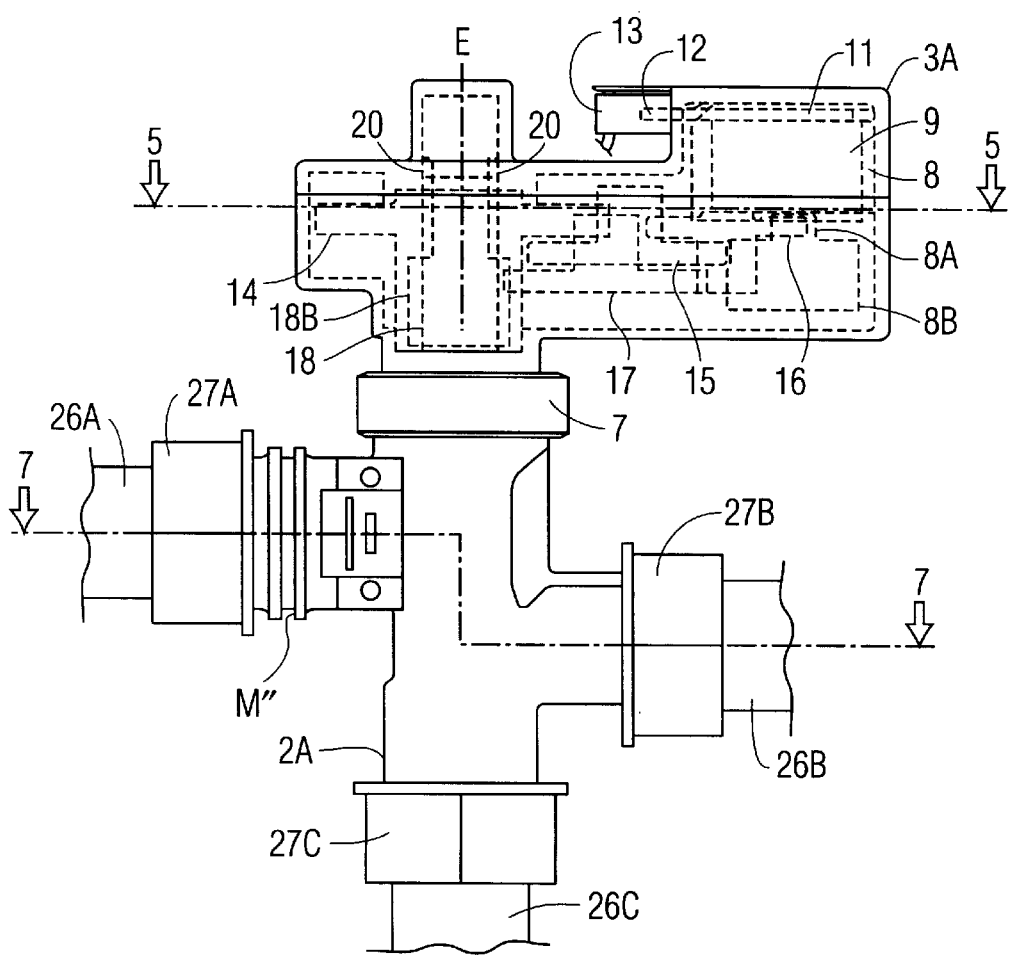
FIG. 4 is a schematic elevation view of the device of FIG. 1, connected to three hydraulic ducts.
Figure 5:
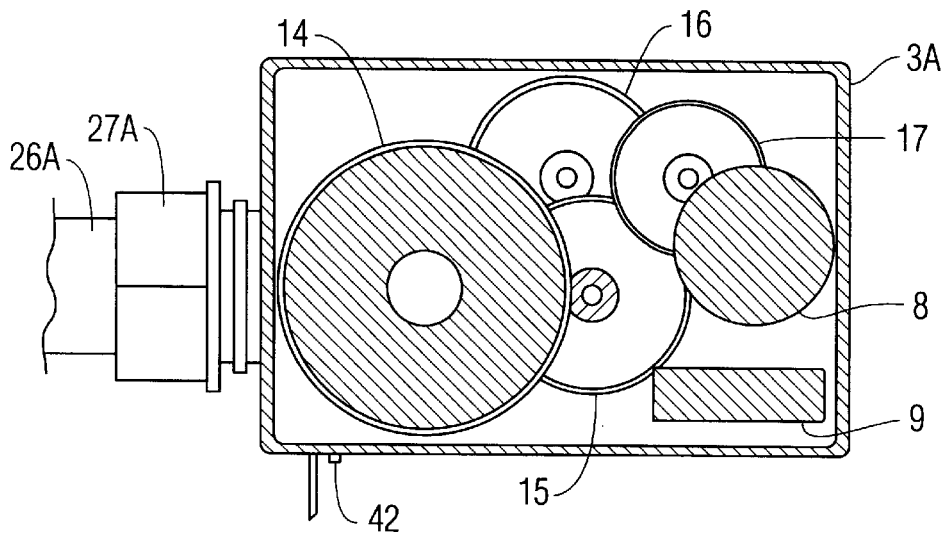
FIG. 5 is a view in section of the device according to the invention, executed according to line 5—5 of FIG. 4.
Figure 6:
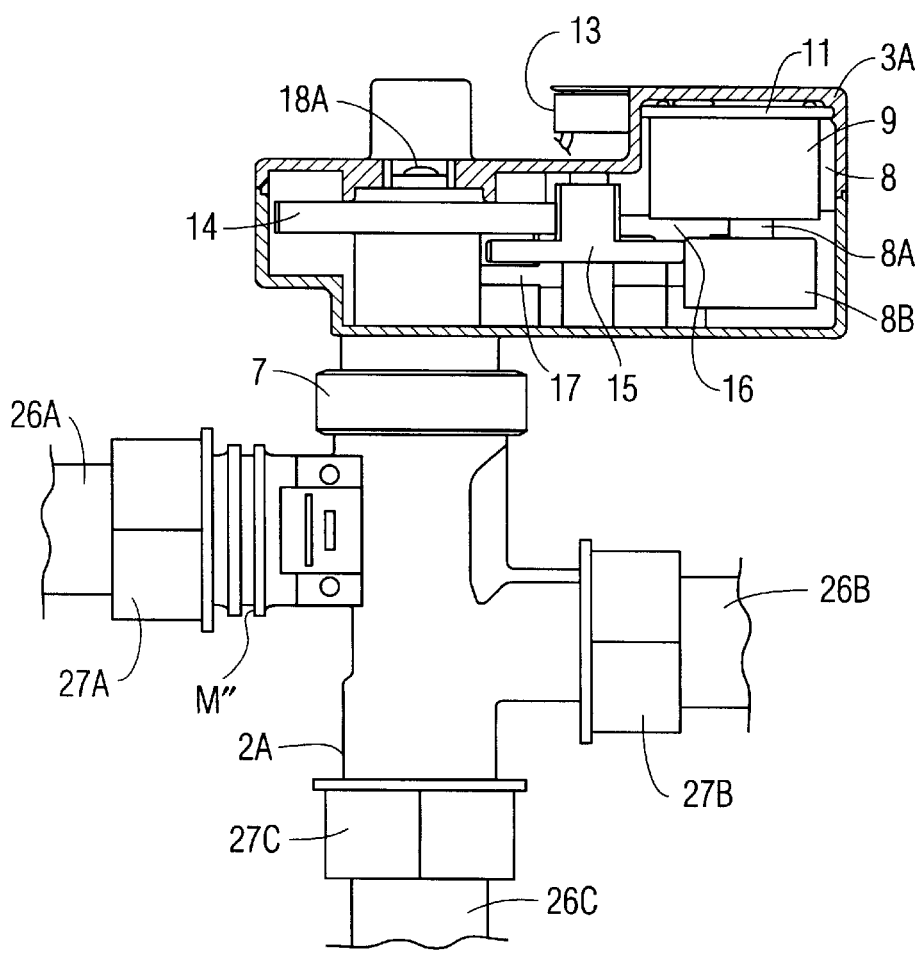
FIG. 6 is a view in section of the device according to the invention, executed according to line 6—6 of FIG. 3.

In FIGS. 1 to 8, with 1 the device subject of the present invention is indicated as a whole, which comprises a flow regulator 2 and an actuator 3; the flow regulator 2 comprises a body in thermoplastic material 2A, being provided with ducts 4, 5 and 6, having relevant couplings 4A, 5A and 6A; in the illustrated case, the ducts 4, 5 and 6 are of the ¾ gas diameter type; with 7 a terminal joint is shown for the actuator 3. The actuator 3 also comprises a body 3A in thermoplastic material, with an electric motor, a kinematic motion or gear reduction, an electric circuit and an electric connector. The motor, indicated with 8, is in particular a bi-directional synchronous motor having two windings; with 8A a pinion is shown, being connected to the motor 8 through a friction 8B, for example of magnetic type; the motor 8 is supplied by means of the cited electric circuit, which comprises for example a displacement capacitor 9 and a resistor 10; the circuit, indicated as a whole with 11, is connected to an external control unit through a connector 12; such a connector 12 is in particular obtained directly on the printed circuit of the circuit 11 and is provided with an attack for the fixing of an external connector 13. The cited gear reduction, or kinematic motion, comprises the gears indicated with 14, 15, 16, 17 which are interconnected among themselves and with the pinion 8A, according to the line M-L-I-H-G of FIG. 3; the rotation of the gear 14 determines the linear displacement, along axis E (FIG. 2), of a particular 18. Such a particular 18 is fixed to the cited shutter, being indicated with 19 (FIG. 8), through a screw 18A (FIG. 6); the gear 14 is furthermore provided with a female thread, in which a male thread 18B (FIG. 4) is inserted, being present in the particular 18; with 20 (FIG. 4) two guides are indicated, within which the particular 18 is linearly movable; the cited kinematic motion is of a conception being per se known and, as is clear, allows the rotation of the motor 8 to determine the linear movement of the shutter 19 along the axis E, by means of the elements previously indicated with 8A, 8B, 14, 15, 16, 17, 18, 18A, 18B, 20.

The body 3A of the actuator is mechanically fixed to the body 2A by means of the coupling or ring 7, that is screwed on a threaded coupling 7A (FIG. 8); the coupling 7-7A and the screw 18A allow for the quick assembly of the actuator 3 to the flow regulator 2.

Figure 8:
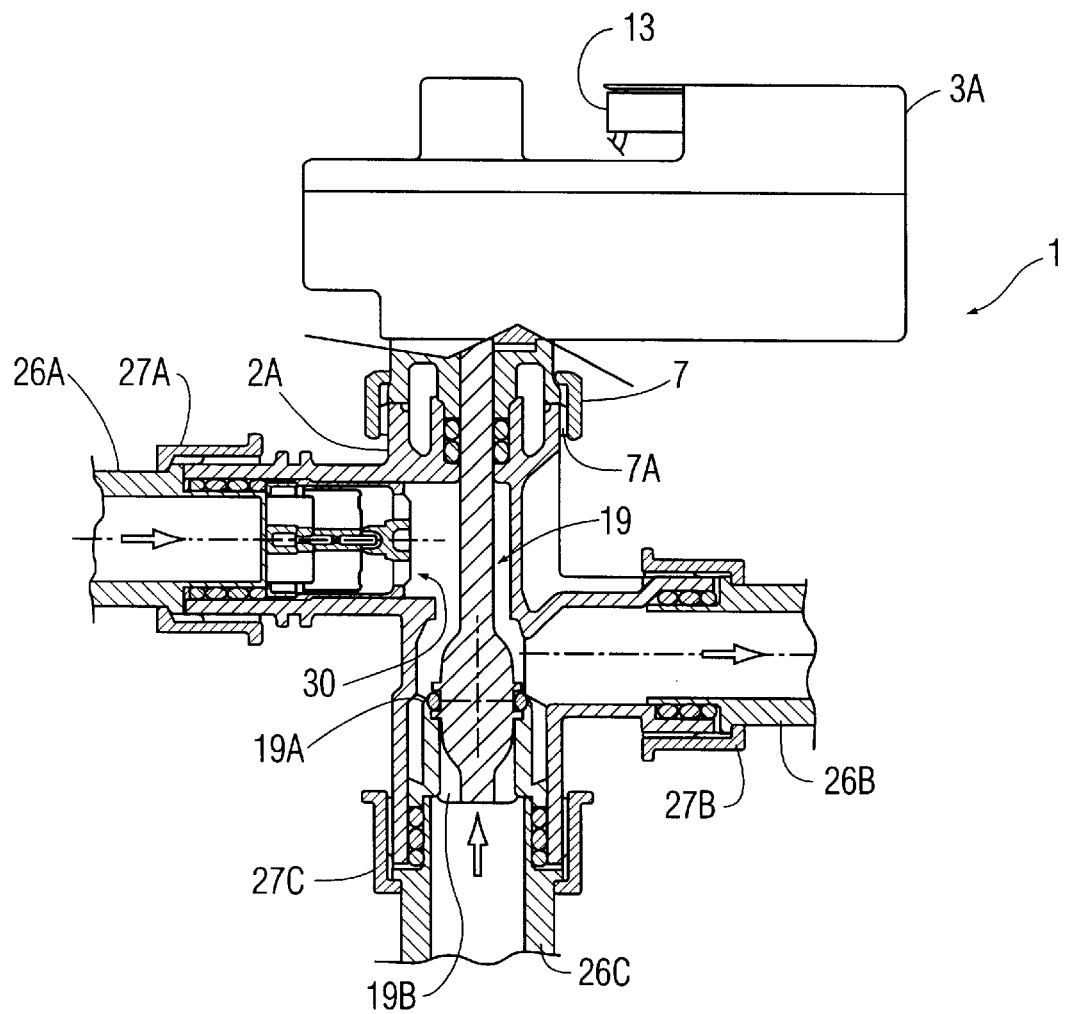
FIG. 8 is a view in partial section of the device according to the invention, executed according to line 8—8 of FIG. 3.

As can be noticed in FIG. 8, the shutter 19 is provided with at least a sealing element 19A, as an elastomeric gasket; the free end of the shutter 19 is provided with driving elements 19B, being able to direct the shutter 19 during its linear movement; the section, not represented, of said driving elements 19B is of the cross type.

Figure 7:
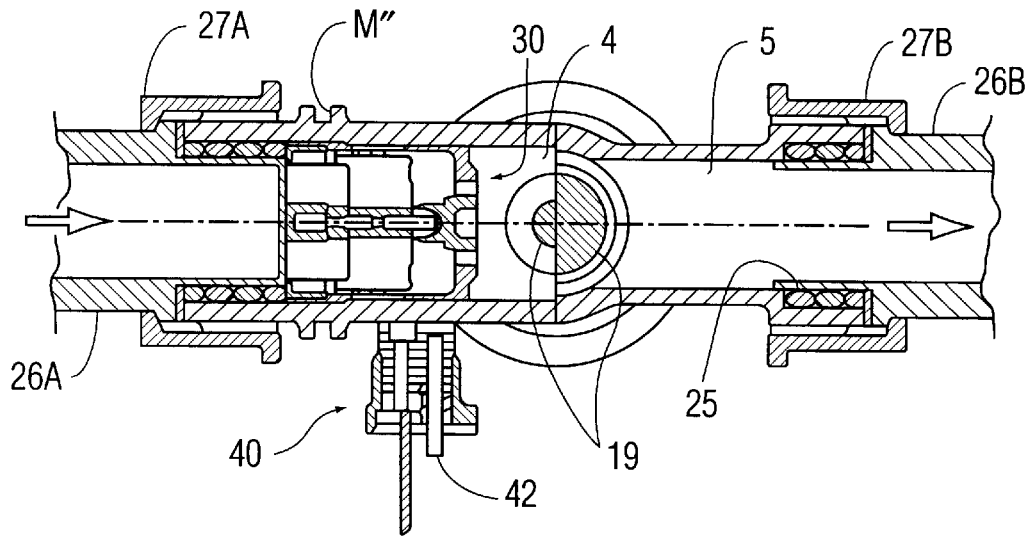
FIG. 7 is a view in section of the device according to the invention, executed according to line 7—7 of FIG. 4.
Figure 9:
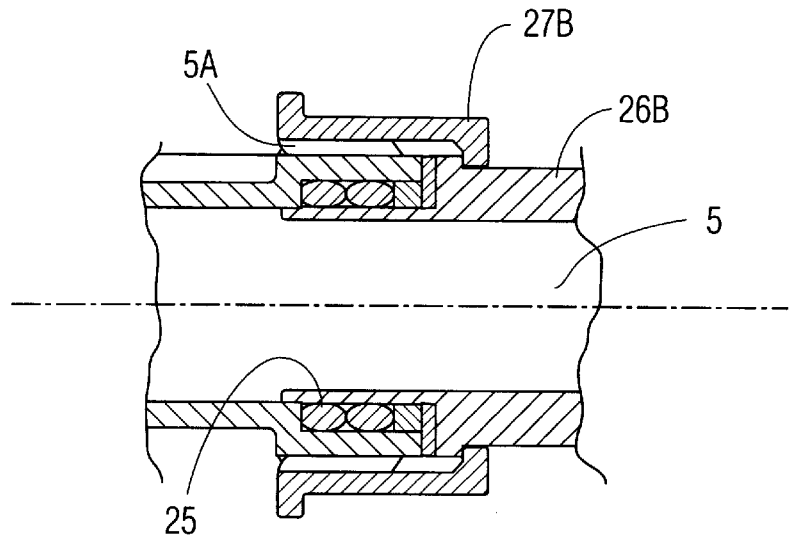
FIG. 9 is an enlarged view of a particular of FIG. 8.

In FIGS. 7, 8 and 9 the coupling terminals of the flow regulator according to invention are visible; such coupling terminals comprise respective sealing elements 25 inserted in the ducts 4, 5 and 6; elements 25, such as O-Ring seals, are provided for carrying out a sealing (for example a radial sealing) onto the external conduits 26A, 26B and 26C, making up part of the hydraulic circuit in which the device 1 is inserted; with 27A, 27B and 27C ring nuts comprising a female thread 28 (FIG. 11) are indicated, that are screwed on the coupling terminals 4A, 5A and 6A. Sealing elements 25 can, alternatively, be integral with the conduits 26, for carrying out a radial sealing on the internal wall of the ducts 4, 5 and 6.

Figure 10:
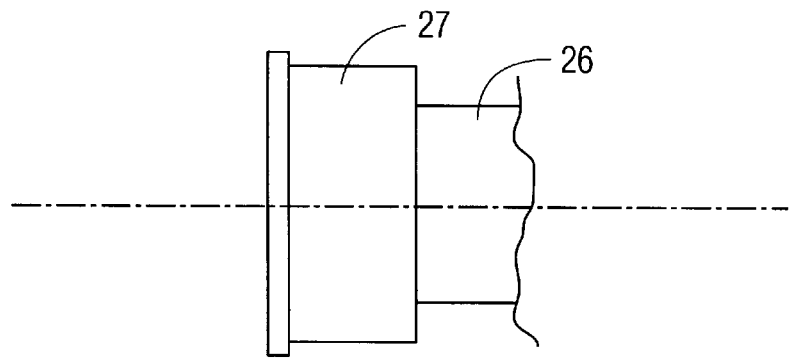
FIG. 10 is a view of a particular of FIG. 6.
Figure 11:
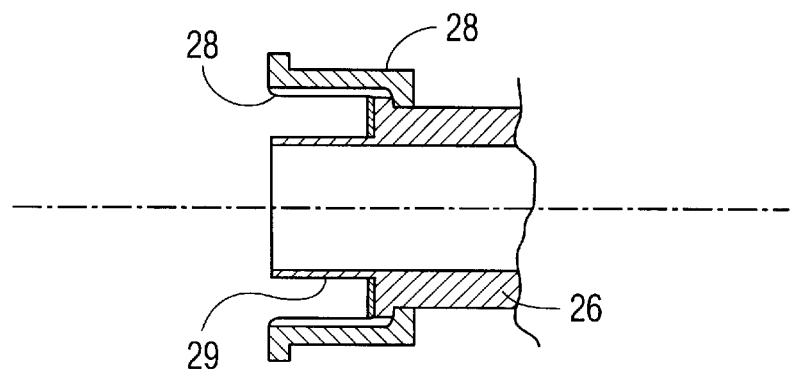
FIG. 11 is a view in section of the particular of FIG. 10.

In FIGS. 10 and 11 the end of one of the external conduits 26 is represented, to be associated to the ducts 4, 5 and 6 of the device according to invention, with the relevant ring nut 27; as can be noticed, the end of the conduits 26 has a restriction 29, for the coupling to a coupling terminal 4A (or 5A or 6A), having the sealing means 25.

Figure 12:
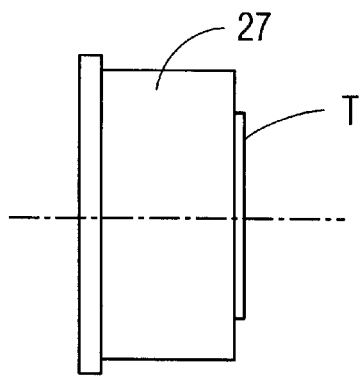
FIG. 12 is a view of another particular of the device according to the invention.
Figure 13:
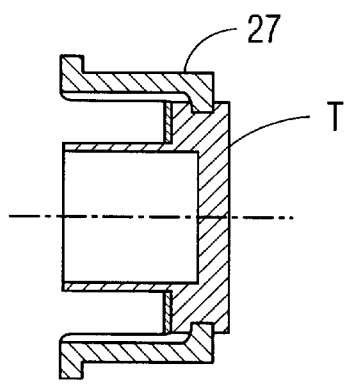
FIG. 13 is a view in section of the particular of FIG. 12.
Figure 14:
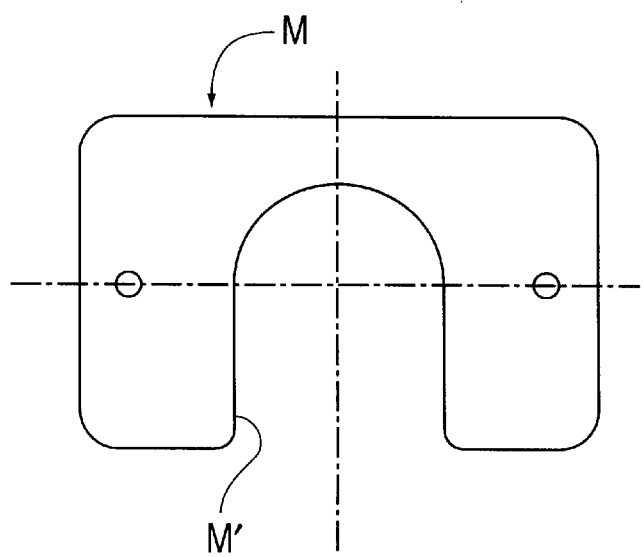
FIG. 14 is a view of a further particular of the device according to the invention.
Figure 15:
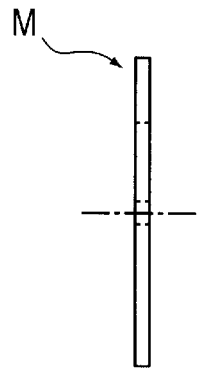
FIG. 15 is a view, from a different angle, of the particular of FIG. 14.
Figure 16:
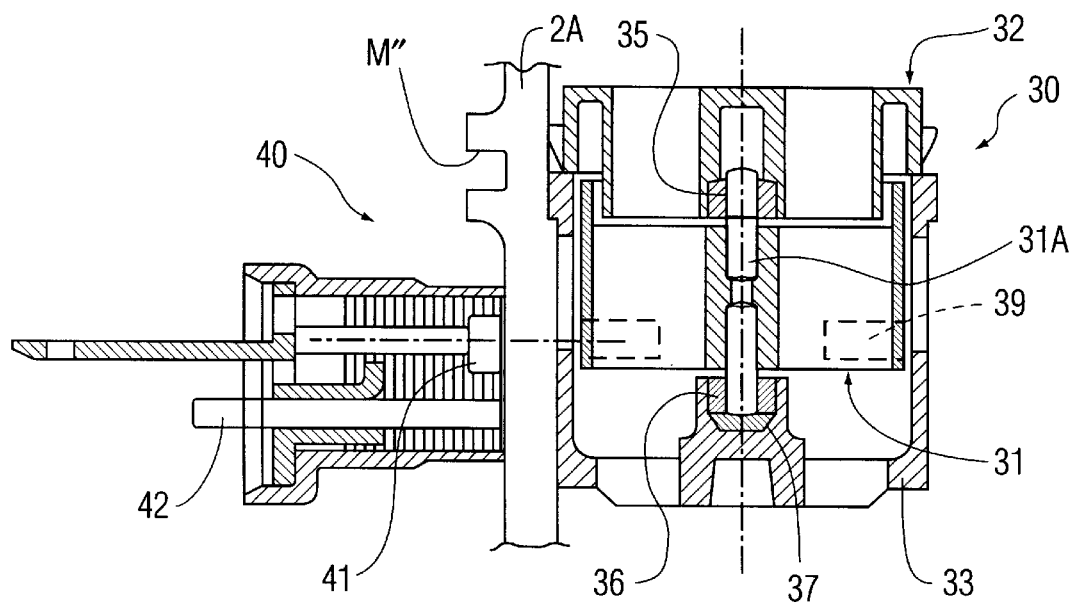
FIG. 16 is a view in section of a flow rate meter making up part of the device according to the invention.

In FIGS. 12 and 13 a plug is represented, indicated with T, which is utilized for occluding one of the ducts 5 or 6 of the device 1, whenever necessary; as can be noticed, such a plug T has a section (obviously closed) being similar to that of the end of one of the conduits 26, and is equipped with a ring nut 27. The fixing of the plug T onto one of the ducts 5 or 6 is realized practically in the same way as the coupling of one of the conduits 26 to the ducts 4, 5 or 6. In FIGS. 14 and 15 a flange is shown, for example in metallic material, indicated with M, which is utilized for the fixing of the body 2A; such a flange M has a central flaring M', able to be inserted in a suitable seat (M", FIG. 6) being present in the body 2A.

In FIGS. 16, 17, 18A, 18B, 18C, 19A, 19B and 19C the components are visible of the flow rate meter making up part of the adjustment device according to the invention; such a meter comprises a group 30 being inserted within the duct 4 and a detection unit 40, being arranged in the external part of the duct 4.

The flow rate meter is, in the illustrated case, of the turbine type; to this purpose, the group 30 comprises an axial impeller 31, to which a flow distributor 32 is associated, having tilted blades; the impeller 31 and the distributor 32 are housed in a container body 33.

The distributor 32, which comprises the blades 34 and a self-lubricating bush 35, is mechanically coupled to the container body 33; such a body 33 comprises a second self-lubricating bush 36, being associated to a thrust-bearing element 37 (constituted for example by a lapped hard stone). In the bushes 35 and 36 the pivot 31A of the impeller 31 is inserted, whose blades 38 are tilted in the opposite sense with respect to the blades 34 of the distributor 32.

Figure 17:
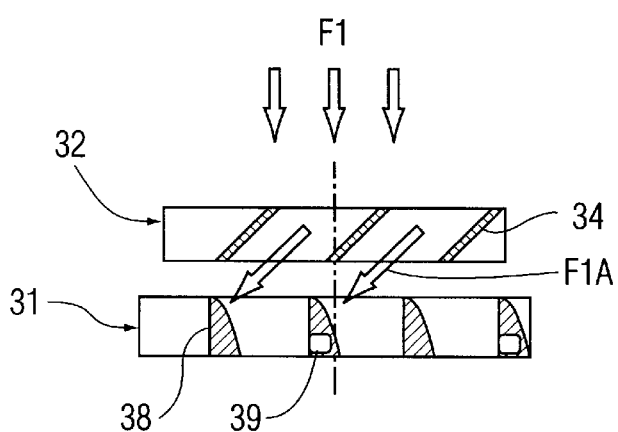
FIG. 17 is a schematic section of a portion of the meter of FIG. 16.

In FIG. 17 the flow distributor 32 and the impeller 31 are represented in a schematic way; with F1 a generic liquid flow is shown that flows within the duct wherein the group 30 is inserted; as can be noticed, said flow F1, which is initially coaxial with such a duct (that in the example is the duct 4), is deviated by the blades 34 of the distributor 32, that therefore determine the angle of incidence of the flow (F1A) onto the blades 38 of the impeller 31. At least one of the blades 38 of the impeller 31 comprises a magnetic element being able to induce impulses in the unit 40.

Said unit 40, which is fixed to the external part of the duct 4, in line with the impeller 31, comprises a magnetic field sensor 41, such as a Hall effect sensor, mounted on the printed circuit that also realizes a male connector 42.

In FIG. 20 the connection circuit is represented in schematic form, between the two windings 8D and 8E of the motor 8 and the connector 12 of the printed circuit 11 (FIG. 4), which has three terminals 12A, 12B and 12C; the electric connection circuit comprises the displacement capacitor 9, that is connected between the two windings 8D and 8E of the motor 8, and the resistor 10, in series with the common terminal 12B of the motor 8; the resistor 10, by creating a voltage drop, allows the use of the motor 8 also with voltages being higher with respect to the nominal voltage of the motor 8.

Figure 21:
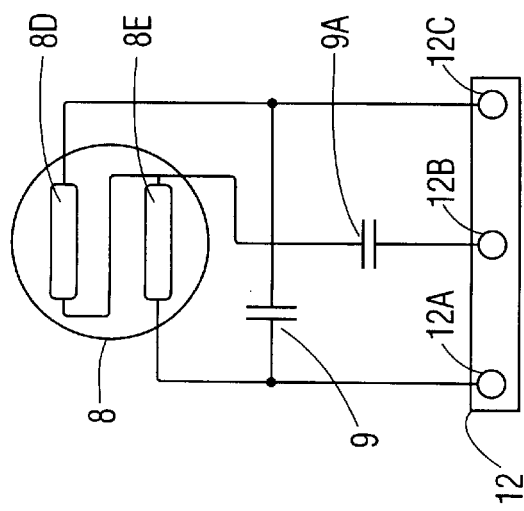
FIG. 21 is a schematic view of the electric supply circuit of an actuator making part of the device according to a possible variant embodiment of the present invention.

In FIG. 21 a possible variation is illustrated of the electric supply circuit of the motor 8 where, instead of the resistor 10, a suitable capacitor 9A is provided for allowing to supply the motor 8 both with low (e.g. 24 V) and high voltages (e.g. 220 V).

Figure 22:
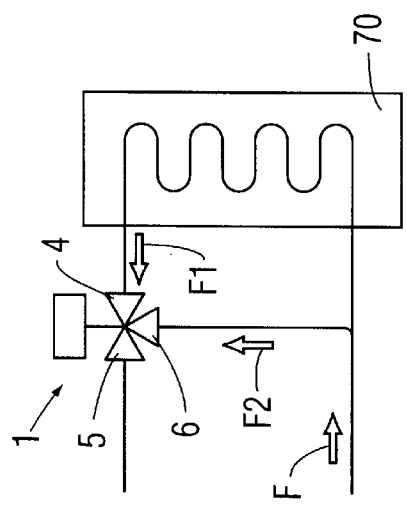
FIG. 22 is a first schematic example of use of the device according to the present invention.

In the case being illustrated in FIGS. 1 to 8, the device according to the present invention is equipped with two inlet (4 and 6) and one outlet (5) but, as previously said, the same could be configured with a single inlet and a single outlet, by occluding one of the inlets by means of the plug T of FIGS. 12 and 13. For example, in FIG. 22, the device 1 is illustrated in the three-ways version, being connected to a utilizing apparatus, or a thermal convectors, indicated with 70; the outlet conduit of the thermal convectors 70 is connected to the inlet duct 4 of the device 1; the inlet conduit of the thermal convectors 70 is also connected in partial derivation, or by-pass, to the second inlet duct 6 of the device 1. In such conditions, when the position of the shutter 19 is changed, the quantity of fluid which circulates within the thermal convectors is varied consequently; in fact, by increasing the quantity of the flow F1, the quantity of the flow F2 is proportionally reduced; it is evident that, in such conditions, the total flow F of the hydraulic circuit is in any case unchanged and the plant as a whole, which comprises a pump (not represented in FIG. 22), is not subject to flow rate and/or pressure rushes.

Figure 23:
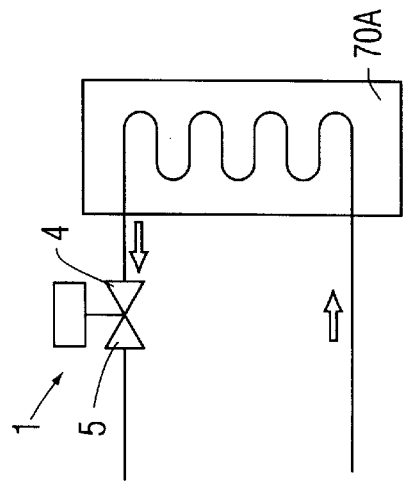
FIG. 23 is a second schematic example of use of the device according to the present invention.

In FIG. 23 the device 1 is instead represented in the version of use with two ways only, being connected to a thermal convector 70A; in this case, the outlet conduit of the thermal convector is connected to the inlet duct 4 of the device 1; it should be noticed that said two-ways regulator is simply the three-way flow regulator of FIGS. 1–8, whose inlet duct 6 has been closed by means of the plug T of FIGS. 12–13.

Figure 24:
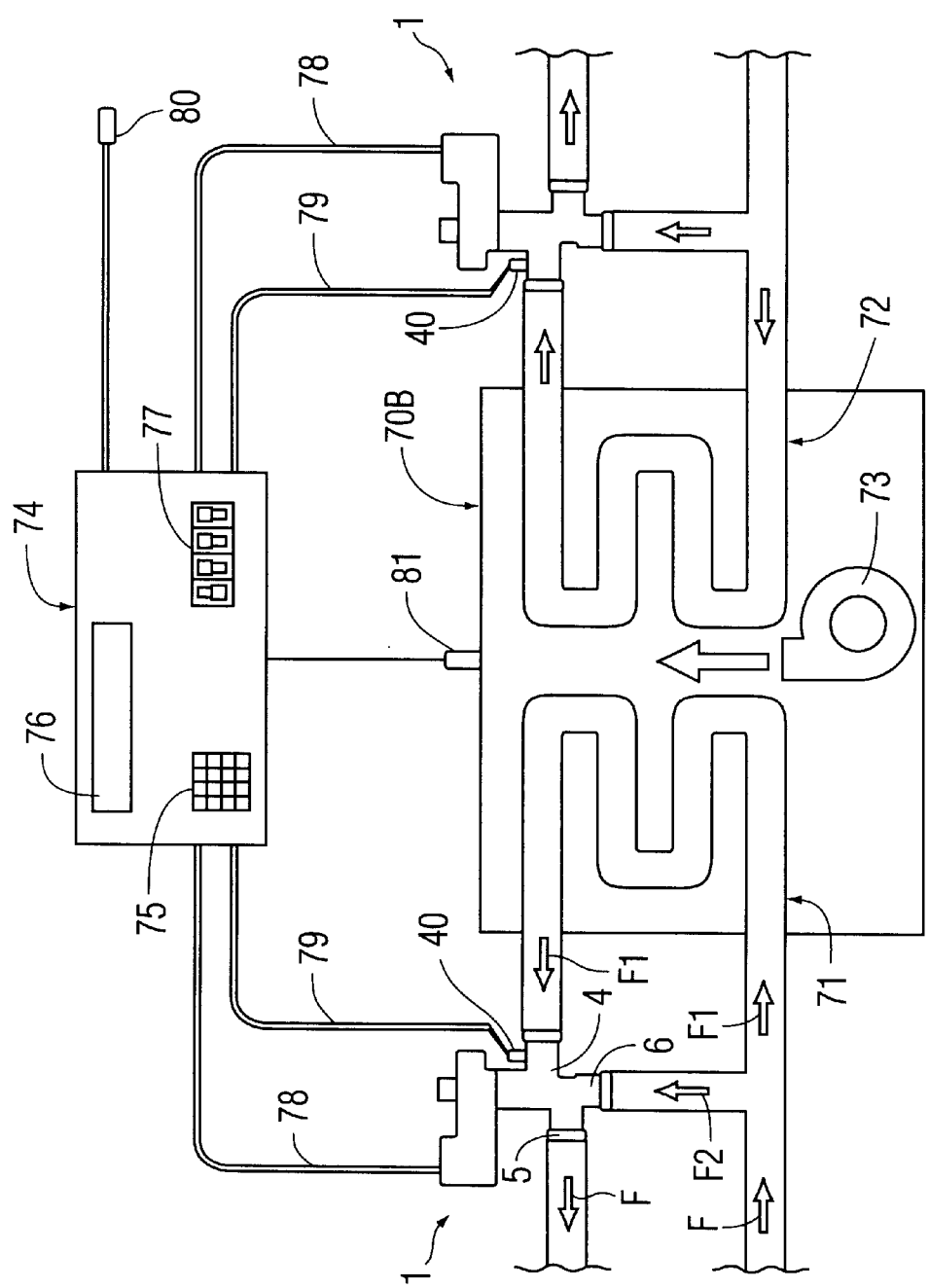
FIG. 24 is a third schematic example of use of the device according to the present invention.

In FIG. 24 an example is represented of use of the device according to the invention; in particular, such a figure illustrates a portion of a conditioning plant.

In a such FIG. 24, with 70B a thermal convector is indicated which, as in the known art, is connected to two distinct hydraulic circuits: a circuit for hot water (heating circuit), indicated with 71, and a circuit for cold water (refrigerant circuit), indicated with 72; the cited circuits are of the closed type, each being provided with a circulation pump for the liquid, not represented in the figure. As can be noticed, the liquid flow within each of the two circuits 71 and 72 is adjusted by a device 1, which is of the three-way type, i.e. of the type being schematically illustrated in FIG. 22. With 73 a fan is shown, for the emission by the thermal convector 70B of air having a temperature being function of the thermal exchange between the heating circuit 71 and the refrigerant circuit 72.

The plant of FIG. 24 comprises a control unit 74, of the microprocessor or microcontroller type, to which suitable memory means are associated, containing data and programs being necessary for the management of the plants.

Said unit 74 comprises a keyboard 75 for the data input, a display 76 for the operating parameter, and switches 77, for example of the "dip-switch" type, for the initial configuration of the unit 74 and/or the devices 1.

Two devices 1 are connected to the control unit 74, by means of respective supply conductors, indicated with 78, and respective conductors 79, for the transmission of signals from the detection unit 40. A sensor 80 of the environment temperature and a sensor 81 of the temperature of the air exiting the thermal convector 70B are also connected to the unit 74. The functioning of the device subject of the present invention will be now described with reference to the heating circuit 71 of FIG. 24. To this purpose, the plant should be considered as being already in operation.

The microcontroller of the unit 74 provides for verifying, by means of the sensor 80, whether the environment temperature is different from that set through the keyboard 75 (the test of the environment temperature is carried out in a cyclic way, for example with intervals of some minutes); in such a case, the microcontroller provides for verifying the temperature of the air exiting the thermal convector 70B and elaborating the two temperature information, according to suitable data tables being present in its memory means; this is done with the aim of carrying out the necessary adjustments, so that the air exiting the thermal convector allows to reach the required environment temperature in the shortest time and without exceeding the prefixed values; this is obtained by adjusting, by means of the device 1, the flow rates of the heating and refrigerant liquids that circulate within the circuits 71 and 72 (the survey of the temperature of the air exiting the thermal convector allows to obtain an more rapid answer for carrying out the adjustment, in order to avoid fluctuations of the environment temperature with respect to the set value).

Let suppose that, to this purpose, an adjustment of the flow rate of the heating circuit 71 is necessary.

The motor 8 is operated by the unit 74, with a given rotation sense (dependent upon the type of adjustment to be carried out), by supplying terminals 12B and 12C of the connector 12 with alternate voltage (supplying terminals 12B and 12A, the motor 8 would be operated in the opposite rotation sense). The rotation of the motor 8 moves the kinematic motion comprising the elements 8A, 8B, 14, 15, 16, 17, 18, 18B.

The element 18B linearly moves the shutter 19 which, by opening/closing the ducts 4 and 6, carries out an adjustment of the liquid flow F1; in particular, the flow F exiting the duct 5 is always equal to the sum of the flows F1 and F2, respectively flowing within duct 4 and duct 6; the variation of the flows F1 and F2 of the hydraulic circuit 71 (and, when required, of the hydraulic circuit 72) is therefore managed by the unit 74 for varying the temperature of the air discharged by the thermal convector 70B.

The flow F1, flowing from the duct 4 to the duct 5, is conveyed by the blades 34 of the diffuser 32 onto the blades 38 of the impeller 31; the blades 34 are tilted in the opposite sense with respect to the blades 38, in order to determine a flow, and therefore a vectorial force F1A (FIG. 17), that acts on the impeller 31 causing its rotation.

It is clear that, with the same quantity of flowing liquid, the number of revolutions of the impeller is a function of the angle of the blades 38 and/or the blades 34; in line of principle, the number of revolutions of the impeller, the liquid quantity being the same, is a proper characteristic value of each turbine meter, and determines the measure resolution.

The rotation of the impeller 31 determines the rotation of the magnetic elements 39, being integral with the blades 38, in order to induce a signal in the detection unit 40; such a signal, being constituted by electric impulses, is a digital signal and therefore can be easily interpreted by the microcontroller of the unit 74.

The number of said impulses is a function of the quantity of flowed fluid, in accordance with prefixed diagrams (the cited "characteristic value" or resolution); the number of such impulses, referred to an established time unit, is proportional to the flow rate of the liquid.

As already said, a suitable microcontroller logic control circuit is associated to the device according to the invention, being present in the unit 74, which is perfectly able to count the time through an internal timer, or clock: it appears therefore clear that, through the device 1, it is possible to know with precision the flow rate of the fluid which flows in the duct 4.

According to invention, the precise adjustment of the flow F1 is therefore obtained by means of the flow rate meter 30, 40, being associated to the duct 4 of the device 1, and the microcontroller of the unit 74, which provides for consequently controlling the necessary actuation for positioning the shutter 19.

Figure 25:
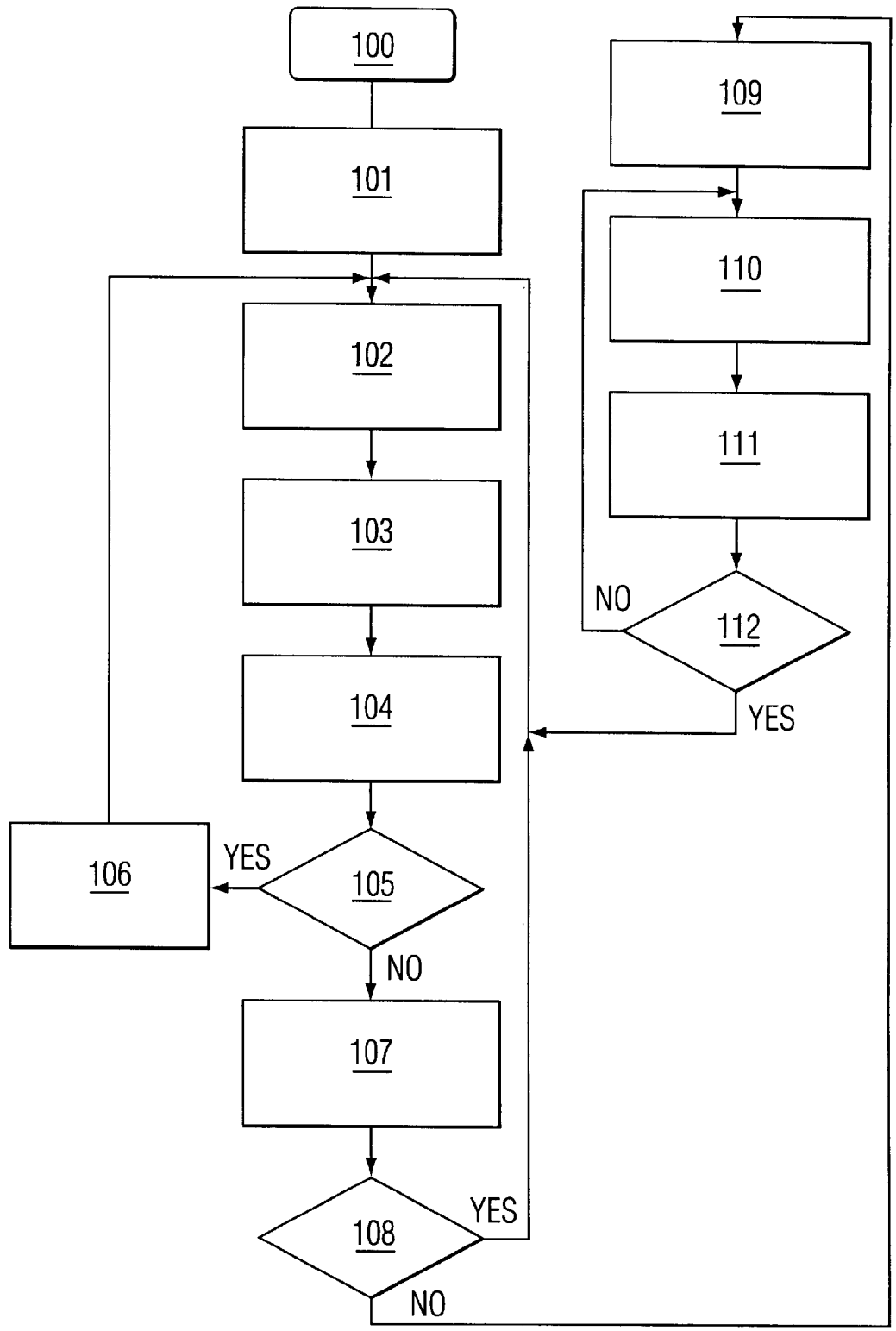
FIG. 25 is a flow diagram which illustrates the operation principle of the device according to the invention.
Figure 26:
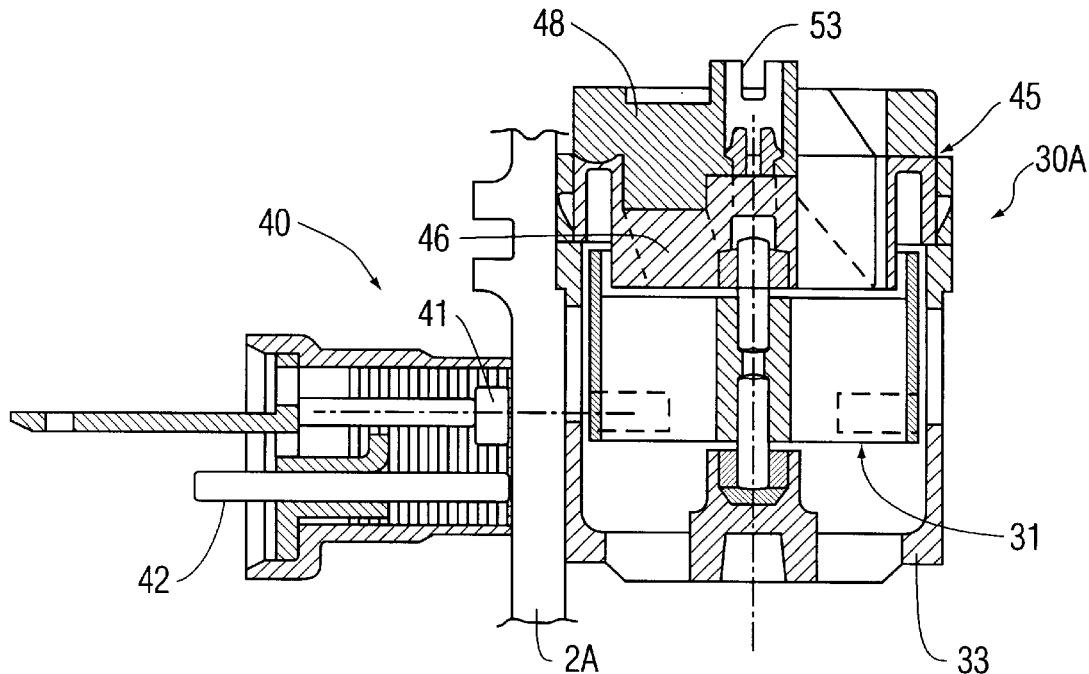
FIG. 26 is a view in section of a flow rate meter making up part of the device according to a possible variant embodiment of the invention.
Figure 27A:
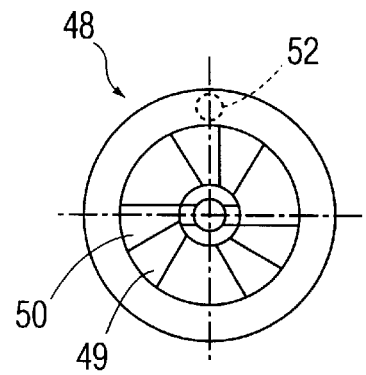
FIG. 27A, 27B and 27C are views in projection and partial section of a particular of the flow rate meter of FIG. 26.
Figure 27C:
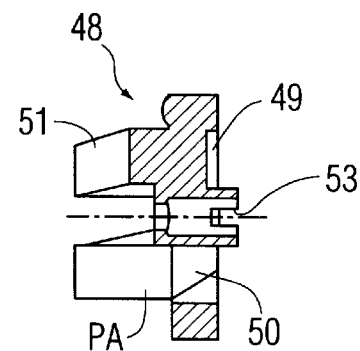
Figure 27B:
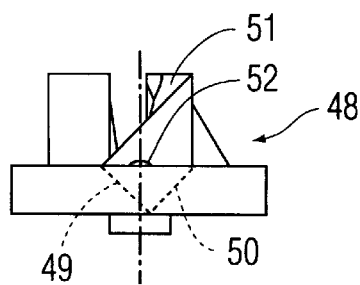

In particular, the control circuit verifies the correspondence between the flow rate value of the liquid F1, and a prefixed reference value, duly codified in the memory means being associated to the microcontroller; in the case in which the flow rate value of F1 is lower than the prefixed value, the control circuit operates the shutter 19, in order to increase the passage in the duct 4; vice versa, in the case in which the flow rate value is greater than the prefixed one, the control circuit operates the shutter 19 in the opposite way, in order to restrict the passage in the duct 4. In FIG. 25 a possible logic control circuit of the position of the shutter 19 is illustrated, in the form of a flow chart.

In such a Figure, block 100 is the start block of the program, which correspond to the switching on of the unit 74. Block 100 passes the control to block 101, which provides for the initial configuration of the unit 74 and to the reading of the program data being present in the memory of the microcontroller.

Block 101 passes the control to block 102, which provides to verify of the selection of the type of thermal convector to which the device 1 is associated; such a selection is carried out during the installation phase of the plant, through the dip-switches 77, and has the function of indicating to the control unit the adjustment range within which the device 1 should operate; by means of said selection, therefore, the microcontroller is informed about the type of the maximum flow rate for the conduit being internal to the thermal convector to be controlled (for example, 20 liters/minute or 2 liters/minute), so that the microcontroller can optimize the adjustment and the positioning speed of the shutter 19 in function of the adjustment to be carried out (for example with movements being more or less quick or accurate); to this purpose, within the memory means being associated to the microcontroller, suitable data tables are present.

Block 102 passes the control to block 103, and provides for showing the instant values on the display 75 and passes the control to block 104, of control of the keyboard 76.

The control is then passed to block 105, which is a test block, that provides for verifying whether buttons have been pressed; in the positive case (output YES), the control is then passed to block 106, that provides to the modification of the data in memory, in function of the selections carried out through the keyboard 76, and the control returns to block 102; in the negative case (output NO), the control is passed to block 107, that provides to the control of the temperatures (through sensors 80 and 81) of the environment and the thermal convector.

The control is then passed to block 108, which it is a test block, which verifies whether the two cited temperatures are collect, in function of the selection, carried out through the keyboard 76, of the desired environment temperature; in the positive case (output YES), the control returns to block 102; in the negative case (output NO), the control is passed to block 109, that provides to the calculation of the new liquid flow rate to adjust, in function of the temperature to be obtained, and to determine the sense of actuation of the motor 8, for producing the new positioning of the shutter 19.

The control is therefore passed to block 10, which provides for actuating the flow regulator device 1, as previously described, in order to move the shutter 19.

The control is then passed to block 111, of management of the flow rate meter 30–40, for the measurement and the calculation of the istantaneous flow rate of the liquid flowing in the duct 4; the control is then passed to block 112, which is a test block, which provides to verify whether the instant flow rate of the liquid is compatible with the data calculated at block 109, for obtaining the desired temperature.

In the positive case (output YES), the movement of the shutter is stopped, with the maintenance of the reached position, and the control returns to block 102; in the negative case (output No), the control returns to block 110, so that the movement of the shutter 19 continues until the necessary flow rate is attained (block 112).

As can be seen, therefore, the control unit of the device 1 provides to detect in a continuous way the flow rate of the liquid, through the meter 30, 40, and activate the relevant actuator 8 and, as a consequence, the shutter 19; in such a way, continuous and specific adjustments of the flow rate of the liquid are carried out. It appears therefore clear as the direct measurement of the flow rate of the liquid allows to obtain an automatic adjustment, being continuous and precise, of the flow entering or exiting the device 1, which is not influenced by the pressure variations being eventually present in the hydraulic circuit.

It is also clear that the automatic closed-loop adjusting system according to the invention and the simple software configuration of the control unit, allows for installing a same flow rate regulator device 1 also in different categories of thermal convectors, which are characterized by hydraulic conduits having different sections.

It should also be highlighted that the meter 30, 40, besides the measurement of flow the rate, allows to realize the control of the comsumptions of the liquid which flows in the hydraulic circuit where the device 1 is inserted. In other words, the device according to the invention allows for calculating with precision the quantity of the liquid flowed in any single thermal convector or heat exchanger.

It is in fact evident that the turbine meter 30, 40 can be advantageously used for measuring, in addition to the flow rate, also the quantity of the liquid. Such a characteristic is advantageous in the case of buildings being equipped with centralized heating, conditioning or ventilating plants, wherein a plurality of users is present. The device according to the invention, which allows for measuring the quantity of liquid flowed within thermal convector, allows as a consequence to measure the real heat comsumptions, and therefore the degree of real use of the plant by each user.

It should also be highlighted that the presence of a coupling system of the quick type allows to speed up the installation operations of the device 1 and eliminates the necessity of high clamping forces. For such a reason, therefore, the body of the device can be advantageously realized in thermoplastic material, which is extremely economic and allows to eliminate the problems cited in the opening of the present description.

The characteristics and the advantages of the device and the method subject of the present invention are clear from the given description. In particular:

- the use of the flow regulator device allows to obtain continuous, precise and rapid adjustments of the temperature of utilizing apparatuses, so optimizing the performances, reducing the energetic wastes and controlling the comsumptions;
- the use of thermoplastic materials, for the realization of the body 2, reduces the costs and the condensate formation on die device;
- the quick coupling of the flow regulator allows an easy installation on the utilizing apparatus and avoid damages, due to high clamping forces;
- a single type of flow regulator device allows to cover a wide range of possible use, so increasing the flexibility and simplifying the stock management, without the need of complex manual adjustments.

From the above, it is therefore clear that the device according to invention, simplifies and remarkably widens its field of use, if compared to the devices of the known type.

It is clear that numerous changes are possible for the skilled man to the flow regulator described as an example, without departing from the novelty principle of the inventive idea.

To this purpose, FIGS. 26–33 represent a particularly advantageous embodiment of the flow rate sensor according to the invention.

In such a case, the impeller group, indicated with 30A, is provided with an adjustable flow distributor 45, in order to vary the angle of incidence of the liquid flow onto the blades 38 of the impeller 31.

The adjustable flow distributor 45 comprises a fixed first element, indicated with 46, fixed to the container body 33 and provided with first tilted blades 47, having a rectangle-triangle section, and three positioning seats 46A, 46B and 46C; the blades 47 are each defined by three planes, indicated with 47A, 47B and 47C; in the illustrated case, the plane 47A is parallel to the axis of the impeller 31.

A movable element 48 is coupled to the fixed element 46 (for example with a release coupling), having blades 48A, which present three tilted planes 49, 50, 51 and a plane PA being parallel to the rotation axis of the impeller 31; the blades 48A and the blades 47 have complementary shapes, i.e. they can match. The movable element 48 further comprises a positioning tooth 52, and a seat 53 for a tool, such as a screwdriver, for operating an adjustment, that consists in the modification of the angular position of the element 48 with respect to the element 22.

Figure 31:
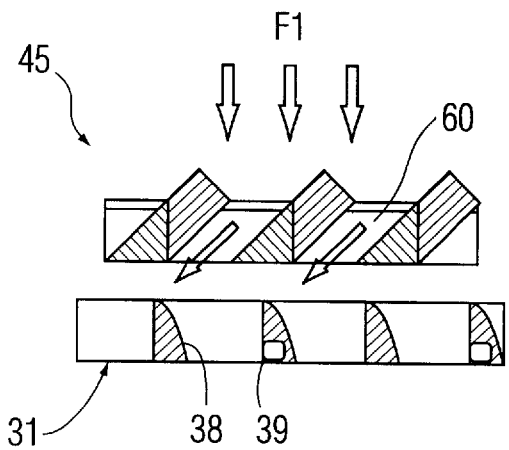
FIGS. 31, 32 and 33 are schematic sections of a portion of the flow rate meter of FIG. 26, in three different working positions.

In FIGS. 29–33 there are represented in a schematic way, the details 46 and 48 of the adjustable distributor 45, the impeller 31 and a generic flow F1 to be distributed. In particular, in FIGS. 31, 32 and 33, the distributor 45 is schematically represented in three different working conditions, depending upon the fact that the tooth 52 is engaged in the seat 46A, or the seat 46B, or the seat 46C; as already said, the element 48 can be angularly moved by means of a suitable mechanical key, such as a common screwdriver, inserted in the seat 53. In FIG. 31, the movable element 48 is in a first working position; in this case the plane PA of the blades 48A is adjacent to the plane 47A of the blades 47 of the element 46; as it can be notice, in such a condition, the blades 48A constitute in practice a prolongation of the blades 47 and the flow F1 is conveyed by means of channels 60, being defined by the surface 47C of the blades 47 and by the plane 51 of the blades 48A; in such a position of the movable element 48, the maximum incidence value of the flow F1 onto the blades 38 of the impeller is obtained: in such a situation a high ratio is obtained between the number of revolutions of the impeller 31, or the value of the signal detected by the sensor 41, and the quantity of the fluid which passes in the duct (4).

Figure 33:
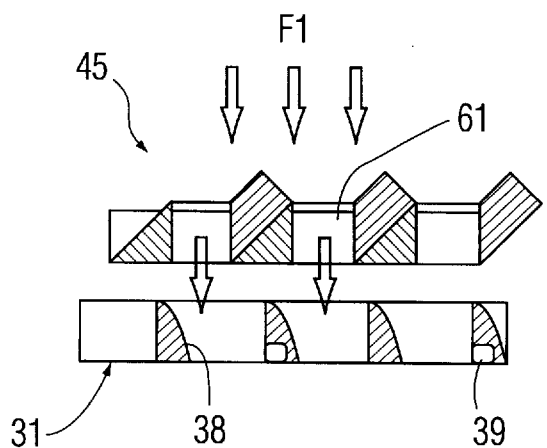

In FIG. 33 the movable element 48 is in a second possible working position; as can be noticed, in this case, the tilted plane 51 of the blades 48A is adjacent to the tilted plane 47C of the blades 47 and the flow F1 is conveyed by means of channels 61, being defined by the planes 47A and PA of the blades 47 and 48A, with a minimum incidence value of the flow F1 onto the tilted blades 38 of the impeller; in such a condition a low ratio is obtained between the number of revolutions of the impeller 31, or the value of the signal of the sensor 41, and the quantity of the fluid that passes in the duct (4).

Figure 32:
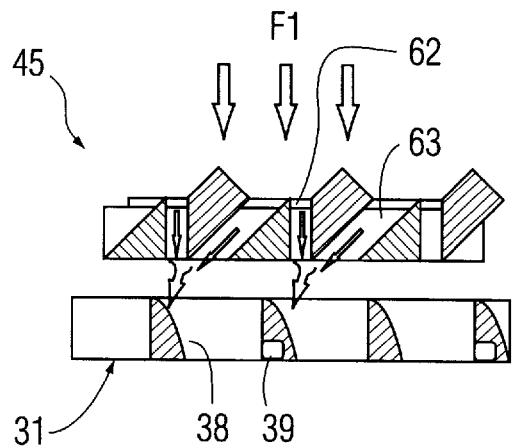

In FIG. 32 the movable element is in an intermediate position with respect to the previous ones; the flow F1 is conveyed by means of two series of channels, indicated with 62 and 63, being defined respectively by the planes 47A and PA of the blades 47 and 48A, and by the planes 51 and 47C of the blades 48 and 47; in this case the incidence value of the flow F1 onto the impeller 31 is intermediate with respect to the previous ones, and is in particular the resulting of the different distribution of the flow F1 in the two different series of channels 62 and 63; each having a different angle and section.

As can be noticed, in the embodiment according to FIGS. 26–33, it is therefore possible to select a prefixed ratio between the number of revolutions of the impeller 31 (or the value of the signal detected by the sensor 41), and the quantity of fluid which passes in the duct (4) where the group 30 is inserted; in accordance with such a variation, the global passage section of the fluid remains however unchanged, and so undesired charge or pressure losses are avoided. As already said, the cited adjustment may be carried out in a very easy way; this is simply carried out in the installation phase, by inserting the head of a screwdriver in the duct 4, in correspondence with the seat 53, and operating a rotation; such an operation involves limited error risks, due to the fact that only three positions are possible, being well defined by the stepping of the tooth 52 in the chosen seat 46A or 46B or 46C.

Such a material selection on the distributor 45, that allows to increase the versatility of the device according to the invention, is also associated to a configuration from the viewpoint of the control logic of the system; also such a configuration is carried out in a simple way, through the dip-switches 77 of FIG. 24; such a configuration allows, at the level of the logic circuit of the device, the variation of the measure resolution of the device, being defined as the ratio between the number of revolutions (or the generated signal) and the quantity of the liquid flowed through the sensor; in such a way the microcontroller can couple the type of carried out configuration with a table of pre determined data, stored in the memory means associated to the microcontroller; such data will correspond to different liquid flow rates diagrams and different values of the ratio between the generated signal and the quantity of liquid.

Therefore, in agreement with the proposed variant, a quick and safe variation of the cited ratio is allowed, between the number of revolutions of the impeller 31 and the quantity of flowed liquid; for example, the selection being illustrated in FIG. 10 allows to obtain about 230 impulses per liter of water, the selection of FIG. 11 about 130 impulses per liter of water and the selection of FIG. 12 about 50 impulses per liter of water. Such a possibility of selection is particularly useful in order to increase the useful life of the device 1, in function of the required level of precision.

As said, in fact, the same device 1 can be used with different categories of utilizing apparatuses and allows the achievement of a great adjustment precision. However, it is clear that a flow sensor being for example designed for obtaining the greater measure resolution at the low fluid rates (for example 0,5 liters per minute), will degrade to a great extent if used at high rates (for example 20 liters per minute); such degrade is the consequence of the greater wear of the mechanical components, due to the greater number of revolutions of the impeller 31. Therefore, according to proposed variant, it is possible, depending upon the type of use of the device, to privilege the measure precision (that it is a typical need of applications with low flow rates) or the useful life of the device (that it is a need more felt in the case of applications with high rates).

The change of the position of the movable element 48 is, as said, advantageously coupled to a selection being operable on the control unit 74, for example by means of some switches 77; in such a way, the microcontroller of the unit 74 is able to couple the type of selection with a table of pre determined data, which correspond to different diagrams of the flow rates, and/or to different values of the ratio between the signal exiting the detection unit 40 and the quantity of the liquid that flows in the duct 4.

According to a further variation, not represented, the element 48 could be moved automatically, by means of a suitable actuator. Such an actuator could be for example of the thermal type, which can expand and/or retract proportionally to the temperature of the fluid; such a solution allows to compensate certain measurement errors, being due to the volume variations of the liquid at different temperatures; in this case the actuator could be constituted by an expanding element, such as a small piston containing a material being expandable in temperature (e.g. wax).

Alternatively, the cited actuator could consist in a bimetallic element, or in an element formed by a shape memory alloy, of the type realized as a spiral spring that, by lengthening and/or shortening, angularly moves the element 48.

According to a further variant, not represented, the element 48 could be moved by exploiting the movement of the shutter 19; in this case the device would be advantageously equipped also with sensors means of the position of the shutter, or of the liquid pressure; such a system allows to optimize the calibration of the flow rate sensor in function of the effective flow rate adjustment, operated by the shutter itself.

In such a case, therefore, the control unit of the device will have a table of pre determined data, where each linear position of the shutter 19 corresponds to a different diagram of the flow rates, and/or a different ratio between the signal and the quantity of liquid in transit.

A further possible variation is that of providing a suitable actuator, being controlled by the unit 74, for producing the angular movement of the element 48; in such a case, the movement could be controlled in function of selections carried out through suitable means, such as buttons or switches.

In other possible variants, the meter for the flow rate and/or the fluid quantity, housed in correspondence of a the terminal of the device according to the invention, could consist in a sensor being different of that herein described as an example, so as different could be the coupling system allowing the device according to die invention to be connected to the hydraulic lines to be controlled. Also the shape of the flow distributor could be different from the previously described one; in such a frame, for example, in order to vary the efficiency or measure resolution of the impeller (or the sensor which fulfils its function), an additional by-pass duct could be provided, with an adjustable inlet section and being connected upstream and downstream from the zone wherein the impeller or the sensor is inserted; this in order to involve the impeller, or the sensor, with a reduced portion of the total flow of liquid, but resting that the remaining portion of flow, which has a prefixed entity in accordance with the operated adjustment, follows in any case the by-pass duct.

In a further variation the control unit of the device according to the invention, with the relevant memory and configuration means (dip-switches) could be incorporated in the body 2A–3A of the same device.

It is finally clear that the described device could be provided with a different number of inlets and/or outlets; for example, rather than providing two inlet ducts and one outlet duct, the device could be provided with two outlet ducts and one inlet duct.

We claim:

1. Device for adjustment of the flow rate of a liquid, circulating within a heat exchanger adapted to be in contact with the air comprising a body operatively connected to said heat exchanger and having an inlet terminal for receiving a flow of a heat exchange liquid and an outlet terminal for discharging said flow of heat exchange liquid, an actuator mounted on said body, a shutter movable within said body in response to said actuator, said shutter being capable of assuming a plurality of different positions, in order to allow the adjustment of the flow rate of the liquid entering or exiting said body, metering means for measuring the instantaneous flow rate of the liquid, a logic control circuit for causing said actuator to move the shutter to control the rate of flow of the liquid as a function of the difference between the instantaneous flow rate detected by said meter and a predetermined liquid flow rate.

2. Device, according to claim 1, wherein said metering means comprises:

a sensor for producing pulse signals proportional to the quantity of liquid which flows within one of said terminals, an electronic control unit comprising a microcontroller, connected to said sensor, memory means operatively connected to the microcontroller within which data indicative of said predetermined liquid flow rate can be stored;

interpreting means operatively connected to said sensor means for interpreting said pulse signals in order to calculate the instantaneous liquid flow rate, comparison means operatively connected to said memory means and to said interpreting means for comparing said instantaneous flow rate with the predetermined one and, in response to a difference between said instantaneous flow rate and the predetermined flow rate, generating a control signal for said actuator, in order to produce a movement of the shutter until the predetermined liquid flow rate and the instantaneous one coincide.

3. Device, according to claim 2, wherein said memory means is adapted to store data to which the control unit is responsive for interpreting said pulse signals in order to calculate the quantity of liquid flowing within said terminal.

4. Device, according to claim 2, wherein said control unit is in the body.

5. Device, according to claim 2, wherein said control unit is configurable as a function of the section of ducts of the hydraulic circuit in which the device is inserted, and wherein within said memory means data are stored which allow the control unit to optimize the adjustment or positioning speed of said shutter as a function of the configuration selected for said control unit.

6. Device, according to claim 2, wherein said sensor is of the turbine type and comprises an axial impeller inserted in said terminal.

7. Device, according to claim 6, whereby said impeller comprises a plurality of blades, at least one of which has an element able to induce pulse signals, and a detecting unit in which said pulse signals are induced.

8. Device, according to claim 7, wherein said detecting unit is arranged outside said terminal, and comprises a magnetic field sensor.

9. Device, according to claim 7, wherein within said terminal an element is provided upstream of said impeller for distributing the liquid flow.

10. Device, according to claim 9, wherein said element for distributing the liquid flow comprises a plurality of blades able to modify the angle of attack of the liquid flow onto the blades of the impeller, the blades of said element being tilted in an opposite way with respect to the blades of the impeller.

11. Device, according to claim 9, wherein said element for distributing liquid flow is adjustable, in order to allow variation of the efficiency and/or resolution of said sensor.

12. Device, according to claim 11, wherein said control unit is configurable as a function of the adjustment selected for said element for distributing the liquid flow and wherein within said memory means said data allow the control unit to self-adapt to the different resolutions of said sensor as a function of the configuration selected for said control unit.

13. Device, according to claim 11, wherein said element for distributing liquid flow comprises a fixed part and a movable part, the position of the movable part with respect to the fixed part being adjustable for modifying the position of the blades of the element for distributing the liquid flow, or the angle of attack of the liquid flow onto the blades of the impeller, in order to allow variation of the ratio between the quantity of liquid which flows and the number of pulse signals induced in said sensor.

14. Device, according to claim 13, further comprising a second actuator for variation of the position of the movable part, said second actuator being responsive to movement of said shutter.

15. Device, according to claim 14, wherein said actuator is provided with means for moving said movable part automatically, as a function of the temperature of the liquid.

16. Device, according to claim 1, wherein said body comprises two inlet terminals and an outlet terminal, or two outlet terminals and an inlet terminal.

17. Device, according to claim 16, further comprising a plug for occluding one of said terminals.

18. Device, according to claim 1, wherein said terminals have means for quick connection to the hydraulic circuit in which the device is inserted, and comprise mechanical coupling means and hydraulic sealing means.

19. Device, according to claim 1, wherein said body is made of a thermoplastic material.

20. Plant for conditioning environmental temperature, comprising:

a heat exchanger within which a liquid can circulate, and means operatively connected to said heat exchanger for adjusting the flow rate of the liquid, including, a sensor for measuring the environment temperature, means for storing a desired environment temperature value, a body having an inlet terminal for receiving a flow of a heat exchange liquid and an outlet terminal for discharging said flow of heat exchange liquid, an actuator mounted on said body, a shutter movable within said body in response to said actuator, said shutter being capable of assuming a plurality of different positions, in order to allow the adjustment of the flow rate of the liquid entering or exiting said body, metering means for measuring the instantaneous flow rate of the liquid, said actuator being responsive to said metering means for moving the shutter to control the rate of flow of the liquid as a function of the instantaneous flow rate detected by said meter and of a predetermined liquid flow rate.

21. Plant, according to claim 20, further comprising a control unit having memory means for storing a predetermined environment temperature, temperature measurement means for measuring the actual environment temperature, comparison means operatively connected to said memory means and said temperature measurement means for comparing the actual environment temperature and the predetermined one, flow rate calculating means operatively connected to said memory means for calculating the theoretical flow rate of liquid which should circulate within the heat exchanger for obtaining the predetermined environment temperature, fluid flow rate adjustment means for adjusting the flow rate of the fluid, means for measuring the instantaneous flow rate of the liquid which circulates within the heat exchanger and comparing the instantaneous flow rate with the theoretical flow rate, and means for deactivating said fluid flow rate adjustment means when the instantaneous flow rate of the liquid which circulates within the heat exchanger is equal to the theoretical flow rate.

22. Method for controlling a device for adjusting the flow rate of a liquid which circulates within heat exchangers for environmental conditioning plants, said device comprising a body having at least two terminals for connection to a hydraulic circuit, one of said terminals being an inlet terminal and the other of said terminals being an outlet terminal, the device further comprising an actuator and a shutter connected to said actuator, said shutter being movable within said body and able, in response to said actuator, to assume a plurality of different positions, in order to allow adjustment of the flow rate of the liquid entering or exiting said body, and further comprising a logic control circuit of the closed-loop type which provides for calculating the instantaneous flow rate of the liquid which flows in a first of said terminals and controlling the positioning of said shutter as a function of the detected instantaneous flow rate and an established liquid flow rate, the method comprising the following steps:

measuring the instantaneous flow rate of the liquid which circulates within the heat exchanger, comparing it with the established liquid flow rate and, in response to a difference between the instantaneous and established flow rates, activating said actuator for producing the movement of said shutter, measuring a new instantaneous flow rate and comparing it with the established liquid flow rate, and interrupting the activation of said actuator when the instantaneous flow rate is equal to the established liquid flow rate.

23. Method, according to claim 22, wherein the logic control circuit modifies the established flow rate as a function of the section of the ducts of the hydraulic circuit in which the device is inserted.

24. Method, according to claim 22, wherein said logic control circuit includes means for calculating the quantity of liquid which flows within said first terminal.

25. Method for air conditioning an environment comprising measuring the environment temperature, comparing the environment temperature with a desired temperature, in response to a difference between the environment temperature and the desired temperature, calculating the theoretical temperature which the exchanger should reach for attaining the desired environment temperature, calculating the theoretical flow rate of liquid which should circulate within the heat exchanger for attaining the theoretical temperature of the heat exchanger, and therefore for obtaining the desired environment temperature, and calculating the instantaneous flow rate of the liquid which circulates within the heat exchanger, and comparing the theoretical flow rate with the instantaneous flow rate, and maintaining the instantaneous flow rate when the instantaneous flow rate is equal to with the theoretical flow rate.

26. Device for adjusting the flow rate of a liquid which circulates within a heat exchanger, comprising a body within which a movable shutter is mounted, said shutter comprising means for adjusting the quantity of the liquid which flows between at least an inlet duct and an outlet duct, an actuator for moving the shutter, a control circuit for controlling the actuator, and a flow rate meter for measuring the flow rate of the liquid which flows in one of said ducts, for the automatic and continuous adjustment of the flow, through the appropriate positioning of the shutter.

* * * * *